United States Patent [19]

Budde et al.

[11] Patent Number: 4,480,307
[45] Date of Patent: Oct. 30, 1984

[54] INTERFACE FOR USE BETWEEN A MEMORY AND COMPONENTS OF A MODULE SWITCHING APPARATUS

[75] Inventors: David L. Budde, Portland; David G. Carson, Hillsboro; David B. Johnson, Portland; Doran K. Wilde, Aloha, all of Oreg.

[73] Assignee: Intel Corporation, Santa Clara, Calif.

[21] Appl. No.: 336,866

[22] Filed: Jan. 4, 1982

[51] Int. Cl.³ ............................................. G06F 13/00
[52] U.S. Cl. .................................................. 364/200
[58] Field of Search ................. 364/200 MS File, 200, 364/900

[56] References Cited

U.S. PATENT DOCUMENTS

| | | | |
|---|---|---|---|
| 3,480,914 | 11/1969 | Schlaeppi | 364/200 |
| 3,566,363 | 2/1971 | Driscoll, Jr. | 364/200 |
| 3,934,232 | 1/1976 | Curley et al. | 364/200 |
| 4,059,851 | 11/1977 | Nutter, Jr. et al. | 364/200 |
| 4,096,572 | 6/1978 | Namimoto | 364/200 |
| 4,151,592 | 4/1979 | Suzuki et al. | 364/200 |
| 4,181,933 | 1/1980 | Benysek | 364/200 |
| 4,214,305 | 7/1980 | Tokita et al. | 364/200 |
| 4,228,496 | 10/1980 | Katzman | 364/200 |
| 4,354,225 | 10/1982 | Frieder et al. | 364/200 |
| 4,376,982 | 3/1983 | Bantz et al. | 364/900 |
| 4,423,483 | 12/1983 | Tague et al. | 364/200 |
| 4,438,494 | 3/1984 | Budde et al. | 364/200 |

Primary Examiner—Gareth D. Shaw
Assistant Examiner—Jameson Lee
Attorney, Agent, or Firm—Owen L. Lamb

[57] ABSTRACT

A number of intelligent bus interface units (100) are provided in a matrix of orthogonal lines interconnecting processor modules (110) and memory control unit (MCU) modules (112). The matrix is composed of processor buses (105) and corresponding control lines; and memory buses (107) with corresponding control lines (108). At the intersection of these lines is a bus interface unit node (100). The bus interface units function to pass memory requests from a processor module to a memory module attached to an MCU node and to pass any data associated with the requests. The memory bus is a packet-oriented bus. Accesses are handled by means of a series of messages transmitted by message generator (417) in accordance with a specific control protocol. Packets comprising one or more bus transmission slots are issued sequentially and contiguously. Each slot in a packet includes an opcode, address, data, control, and parity-check bits. Write-request packets and read-request packets are issued to the memory-control unit. The memory-control unit responds with reply packets. A message controller (416), bus monitor (413), and pipeline and reply monitor (414), run the memory bus in a three-level pipeline mode. There may be three outstanding requests in the bus pipeline. Any further requests must wait for a reply message to free-up a slot in the pipeline before proceeding. Request messages increase the length of the pipeline and reply messages decrease the length of a pipeline. A control message, called a blurb, does not affect the pipeline length and can be issued when the pipeline is not full. The different messages are distinguished by three control signals (405) that parallel the data portion of the bus. The message generator (417) and interface logic (404) drive these control lines to indicate the message type, the start and end of the message, and possible error conditions. The pipeline and reply monitor (414) and the message controller (416) cooperate to insert a reply to a particular request in the pipeline position corresponding to the particular request that invoked the reply.

8 Claims, 3 Drawing Figures

INTERFACE FOR USE BETWEEN A MEMORY AND COMPONENTS OF A MODULE SWITCHING APPARATUS

CROSS-REFERENCES TO RELATED APPLICATIONS

U.S. Pat. No. 4,325,120 "Data Processing System" of Stephen Colley et al, filed on Dec. 21, 1978, granted on Apr. 13, 1982 and assigned to Intel Corporation;

U.S. Pat. No. 4,315,308 "Microprocessor Interface Control Apparatus" of Daniel K. Jackson, filed Dec. 21, 1978 and assigned to Intel Corporation;

U.S. Pat. No. 4,315,308 filed Dec. 21, 1978, granted on Feb. 9, 1982 entitled "Interprocessor Communication System," by George Cox et al, filed Aug. 5, 1981 and assigned to Intel Corporation;

U.S. Pat. No. 4,315,310 "Input/Output Data Processing System" of John A. Bayliss et al, filed on Sept. 28, 1979, granted on Feb. 9, 1982 and assigned to Intel Corporation;

U.S. Pat. No. 4,407,016 "Miroprocessor Providing an Interface between a Peripheral Subsystem and an Object-Oriented Data Processor," of John A. Bayliss et al, filed Feb. 18. 1981, granted on Sept. 27, 1983 and assigned to Intel Corporation;

U.S. Pat. No. 4,438,494 "Method and Apparatus of Fault-Handling in a Multiprocessing System," by David Budde et al, filed on Aug. 25, 1981, granted on Mar. 20, 1984 and assigned to Intel Corporation;

U.S. Pat. No. 4,415,969 "Macroinstruction Translator Unit," of John A. Bayliss et al, filed on Feb. 7, 1980, granted on Nov. 15, 1983 and assigned to Intel Corporation; and U.S. Pat. No. 4,367,524 "Macroinstruction Execution Unit," of David Budde et al, filed on Feb. 7, 1980, granted on Jan. 4, 1983 and assigned to Intel Corporation.

Application Ser. No. 342,837, "Arbitration Means for Controlling Access to a Bus Shared by a Number of Modules" of David Budde et al, filed on Jan. 4, 1982, and assigned to Intel Corporation.

FIELD OF THE INVENTION

This invention relates to multiprocessing systems, and more particularly to an interface for interconnecting memory modules with other modules in a module-switching apparatus.

DESCRIPTION OF THE PRIOR ART

A requirement of multiprocessing systems is that a plurality of data processors must be selectively connectable by means of module-switching apparatus to a plurality of memory modules. This arrangement provides alternate and additional access paths to the memory modules to meet system resource-allocation requirements and thereby increase overall system processing capability. Prior to the development of very large-scale integration (VLSI) technology, multiprocessing systems were concerned with meeting the requirements of modularity and automatic configuration control with emphasis on increasing overall system productivity. Very little attention was given to the configuration of the components in the system and the size and number of wires necessary to interconnect these components, because the technology did not place severe restrictions on these parameters. In VLSI technology the use of existing interfaces and signaling capability with microprocessors is prohibitive because of limitations imposed by die size and the small number of input/output pins available on the VLSI package. To solve these problems in VSLI technology, components of the module-switching apparatus have to use fewer actual lines interconnecting the modules, but still be able to handle data movement, control operations, and handle arbitration between contending requests over a common bus, functions which are just as complex as those of previous data processing systems.

In summary, it is desirable to have a memory bus protocol which involves a minimum number of pins, eliminates the necessity for separate interrupt lines, which makes arbitration part of each component chip so that no additional part numbers are necessary, and which makes the system completely modular so that it can be expanded or contracted to meet specific needs.

BRIEF SUMMARY OF THE INVENTION

Briefly, the invention is concerned with a memory bus and its protocol which is used for all communication between a memory control unit and other system components. Accesses are handled by means of a series of messages transmitted in accordance with a specific control protocol. Packets comprising one or more bus transmission slots are issued sequentially and contiguously. Each slot in a packet includes an opcode, address, data, control, and parity-check bits. Write-request packets and read-request packets are issued to the memory-control unit. The memory-control unit responds with reply packets. For maximum efficiency, the memory bus runs in a three-level pipeline mode. There may be three outstanding requests in the bus pipeline. Any further requests must wait for a reply message to free-up a slot in the pipeline before proceeding. Request messages increase the length of the pipeline and reply messages decrease the length of a pipeline. A control message, called a blurb, does not affect the pipeline length and can be issued any time the pipeline is not full. The different messages are distinguished by three control signals that parallel the data portion of the bus. The message source drives these control lines to indicate the message type, the start and end of the message, and possible error conditions.

In accordance with an aspect of the invention, components maintain means for establishing a pipeline for requests and replies, means for monitoring the pipeline, and means for inserting a reply to a particular request in the pipeline position corresponding to the recognized request.

BRIEF DESCRIPTION OF THE DRAWINGS

The foregoing and other objects, features, and advantages of the invention will be apparent from the following detailed description of a preferred embodiment of the invention as illustrated in the accompanying drawings wherein.

DETAILED DESCRIPTION

Figure 1:
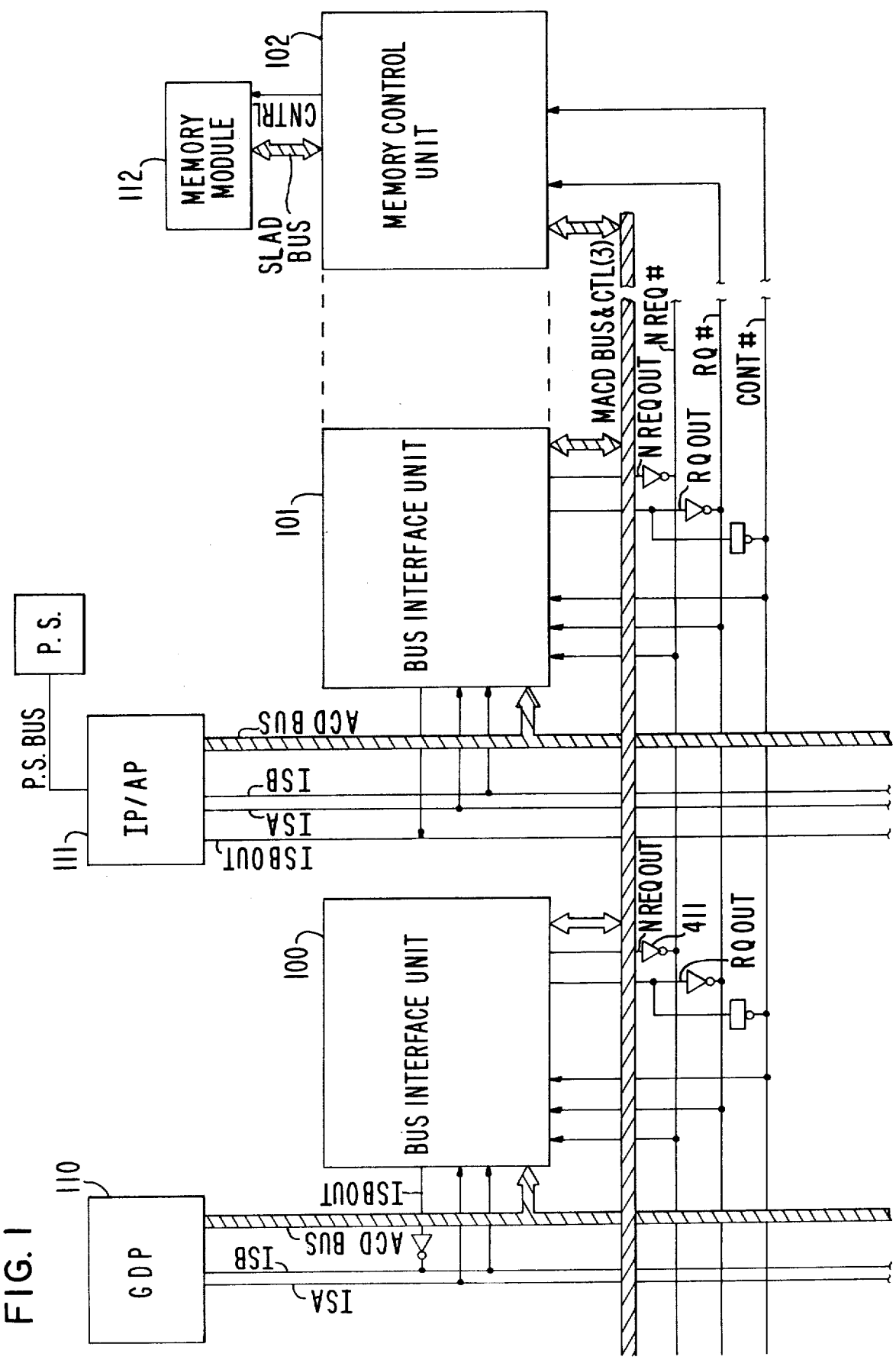
FIG. 1 is a functional block diagram illustrating the various components of a multiprocessing system in which the invention is embodied.

FIG. 1 is a diagram of a data processing system employing an interconnect mechanism in which the present invention is embodied. The interconnect mechanism provides data processors with connection and access capability to a main memory. The interconnect mechanism is more fully described in the above-referenced U.S. Pat. No. 4,438,494, "Method and Apparatus of Fault-Handling in a Multiprocessing System," by David Budde et al, granted on Mar. 20, 1984 and assigned to Intel Corporation.

There are three module types in the central system: GDP, IP (with an associated attached processor, AP), and Memory. All GDP modules are identical; thus, any GDP module can act as a backup resource for any other GDP. Each IP module provides an interface between the central system and one I/O subsystem. All IP modules have identical interfaces into the central system, but potentially different I/O subsystem interfaces. To act as a backup resource, the IP module must interface to the same AP. Memory modules are only attached to two memory buses, the primary and backup buses. Backup memory modules must be attached to the same two memory buses.

The interconnect mechanism is comprised of two Very Large-Scale Integrated-circuit (VLSI) chips. One chip is a bus interface unit (BIU-100), and the other chip is a memory control unit (MCU-102). The interconnect mechanism is a system of orthogonal lines arranged in a matrix. This matrix is composed of processor buses (ACD) and corresponding control lines, and memory buses (MACD) and corresponding control lines. At the intersection of these lines there is a bus interface unit (for example, 100). The bus interface unit responds to access requests from a processor (110) received over the processor bus, and switches them onto the appropriate memory bus for distribution to the correct segment of the address space in a memory module (112). Similarly, reply messages from a memory module are routed onto the memory bus by the Memory Control Unit (MCU-102). In response to a reply message, the appropriate bus interface unit selects and switches the data onto the processor bus in correct sequence.

Each processor bus supports one Generalized Data Processor (GDP-110) or one I/O Processor/Attached Processor (IP/AP) pair (111). The processor bus is a synchronous, multiplexed, bidirectional, 16-bit bus. This bus makes connection to the interconnect system on the processor side of the bus interface unit (100). The processor bus is described in detail in the above-referenced U.S. Pat. No. 4,315,308 "Microprocessor Interface Control Apparatus" of Daniel K. Jackson, filed Dec. 21, 1978 and assigned to Intel Corporation. The GDP (110) is described in detail in the above-referenced U.S. Pat. No. 4,325,120 "Data Processing System" of Stephen Colley et al, filed on Dec. 21, 1978 and assigned to Intel Corporation. The IP (111) is described in detail in the above-referenced U.S. Pat. No. 4,407,016 "Microprocessor Providing an Interface between a Peripheral Subsystem and an Object-Oriented Data Processor," of John A. Bayliss et al, filed Feb. 18, 1981 and assigned to Intel Corporation.

Each memory bus supports one or more memory modules (112). Each memory module is connected to the memory bus through the Memory Control Unit (MCU, 102). The MCU works together with the bus interface unit in routing accesses. Each MCU controls a single 256K byte to 4M byte dynamic memory array. As access requests are passed along the memory bus, the MCU selects and responds to those requests directed to addresses within the address space of its array.

Since GDP processors make variable-length accesses on any byte boundary, single access will sometimes span two memory buses. A time-ordered memory bus arbitration scheme described subsequently guarantees access indivisibility.

Each MCU in the system logically attaches to one of the memory buses (MACD) and controls a single four-byte-wide array of memory.

The memory storage interface generated by the MCU drives a memory module (112) which is comprised of a single 40-bit array (includes 7 ECC bits and a spare) of memory (256K bytes using 64K RAM parts). The memory interface contains the following signals:

SLAD bus (519): 20-bit multiplexed address and data (latches are provided next to the array to latch and multiplex the address for multiplexing from/to the 20-bit bus);

Control lines (521):

RAS, CASIN (dynamic RAM timing);

WE: write Enable;

DEIN: Address Mux (selects row or column address in an external address multiplexer)

The bus interface unit/memory bus is a packet-oriented bus. A packet is an identifying "envelope" or header plus message contents (data) which provides basic communication of requests and data between the MCU and the bus interface units. The packet bus contains twenty-one signal wires which are shown in FIG. 1:

MACD (15:0) = 16 bits of multiplexed data, address and control

CTL (2:0) = 3 bits of packet control

CHK (1:0) = 2 bits of parity

Five arbitration signal wires are provided to arbitrate among bus interface units contending for access to the packet bus:

NREQOUT

RQOUT

RQ#

CONT#

NREQ#

Appropriate response to hardware error conditions is based upon a "confinement area" concept which partitions the interconnect system of FIG. 1 into a number of areas, shown in detail in the above-referenced Budde, et al U.S. Pat. No. 4,438,494.

The signal lines that make up the interfaces between the various components comprising the interconnect mechanism are briefly described in the paragraphs that follow.

The following signal lines allow communication between one attached processor and bus interface units in a column of the switching matrix. A bus interface unit reads initialization and configuration information on these lines at cold start time (INIT# assertion). A bus interface unit may signal reception of an interprocessor communication (IPC) sent to the processor in accordance with the teachings of the above-referenced U.S. Pat. No. 4,315,308. Electrically, there are four signal types employed: input only, output only, bidirectional, and wire-or. The '#' suffix indicates that the line is effected when asserted low. The wire-or signals use pin pairs: a line driver and an observer. This way, a component may assert one of these signals and all others may observe. The line driver (output) drives an open-collector Schottky TTL inverter, which acts on (pulls down) the signal line (an input). The convention used is to name the signal line (and input pin) by the function of the line. (An external pullup is required on these lines and they are asserted low.) The line driver (output pin) has 'OUT' appended to the basic name. An example of this is the RQ#-RQOUT pair.

ACD Bus [15:0]-(bidirectional)
  The Address/Control/Data (ACD) lines are the basic information path between the bus interface units in a column and the processor in the same column. Typical operation involves time-multiplexing data on these pins in the following order:
  Control information for bus transactions,
  Address information for the data operation requested,
  Data requested by the preceding address and control.

The interpretation of data presented on ACD 15:01 is controlled by ISA and ISB, described below. Also, certain configuration information is accepted from the ACD 15:01 pins, with assertion of INIT#.

ISA(input)
  Initiation of a transaction by a processor is signaled using ISA as a data latch enable. Also, cancellation of a processor's request may be signaled on ISA, by stretching its assertion an addtional cycle.

ISB(input)
  To allow cooperation between bus interface unit's on a processor bus, to control data latching times of the attached processor, and to inform a bus interface unit about the condition of another's transaction(s), the ISB pin is provided to sample the wire-or state of all of the bus interface unit's ISBOUTs. ISB assertion changes its meaning as an ACD transaction proceeds: IPC, data stretch, data good, bus error, as more fully described in the above-referenced Jackson patent application.

ISBOUT-(output)
  Response to processor requests is signaled using ISBOUT as a data latch enable and an error indicator (following the transaction). Also, when no transaction is underway, the bus interface unit may signal, on ISBOUT, reception of an Interprocessor Communication message (IPC) to the attached processor. The ISBOUT lines from bus interface units in a column (parallel to the ACD bus) drive open-collector STTL inverters, which act on the ISB signal line.

The following signal lines allow a bus interface unit to share access to the memory bus with other bus interface units in a row. These signal lines allow the handling of a new processor request, gaining memory bus access, managing time-ordered arbitration, and cooperation with other bus interface units.

NREQOUT(output, asserted high)
  Upon recognition of an access request from a processor requiring use of the memory bus, a bus interface unit signals existence of a new time-ordering cycle to other bus interface units by asserting NREQOUT. NREQOUT lines from bus interface units in a row (parallel to the MACD bus) drive open-collector inverters, which act on the signal line NREQ# (below) to cause it to be pulled down when any one or more NREQOUTs are asserted.

RQOUT(output, asserted high)
  As a new time-ordering service period is recognized, an arbiter machine in a bus interface unit will assert request (RQOUT) if it has a request pending for participation in arbitration in that time-ordering cycle. All the RQOUT lines from bus interface units in a row (parallel to the MACD bus) are or-tied to the RQ# line (an input described below). Any one RQOUT asserted will pulldown RQ#.

NREQ#-(input, low asserted)
  NREQOUT lines from bus interface units in a row drive open-collector inverters, which act on the signal line NREQ# and cause it to be pulled down when any one or more NREQOUTs are asserted. New time-ordering cycles are recognized by bus interface units when NREQ# is asserted.

CONT# (input, asserted low)
  RQOUT lines from bus interface units in a row drive external circuits, which act on the signal line CONT# and cause it to be pulled down when any two or more RQOUTs are asserted by the arbiter machines within the bus interface units. CONT# indicates that there is contention for the bus.

RQ# (output, asserted low)
  RQ# is an input from an external line driven by all the or-tied RQOUT lines from the modules (bus interface units) attached to the MACD bus. Any one RQOUT asserted will pull down RQ#. As a new time-ordering service period is recognized, a arbiter machine in a bus interface unit will assert request (RQOUT) if it has a request pending for participation in arbitration in that time-ordering cycle.

The following signal lines allow a bus interface unit to communicate with memory units and other bus interface units in a row on its attached memory bus. Data, data check, and bus and buffer control lines are provided. A bus interface unit reads some initialization and configuration information on these lines at cold start time (INIT# assertion).

MACD [15:0] (bidirectional, tristate outputs)
  The primary data path between the bus interface unit and attached memory modules is the MACD bus. Typical operation involves time-multiplexing data on these lines in the following order:
  Control information for bus transactions,
  Address information for the operation requested,
  Data requested by the preceding address and control.

Three signal lines, CTL [2:0], described below, provide timing and validity information for data presented on the MACD bus. Stretch cycles are not supported on the MACD bus by the bus interface unit; requests and acknowledgments are transmitted as full, contiguous blocks. Certain configuration information is accepted from this bus with assertion of INIT#.

CTL [2:0] (bidirectional, tristate outputs)
  These signals denote the start and end of the three types of memory bus transactions: requests (opcoded), replies (nonopcoded, implicitly addressed reply), and blurbs (opcoded). Any memory bus component drives these signals with data it asserts onto the memory bus. The encoded meanings of the signals are:
  111 Idle
  001 Request: normal
  000 last cycle warning
  011 Reply: normal
  010 last cycle warning 110 first cycle of write ack. nondata reply (last cycle signif.)

101 Blurbs: normal (not presently used)

100 last cycle warning

The following signal lines allow communication between one attached memory control unit (MCU) and the bus interface units in a row of the switching matrix. The signal lines described below provide system information to the MCU, defining its behavior in a data processing system:

CLKA, CLKB (inputs)

CLKA and CLKB provide basic timing references for the BIU and MCU. CLKB lags CLKA by (nominally) ¼ cycle (90 degrees). Arbitration related signals are driven with CLKA falling, and sampled with CLKA falling. MACD [15:0] is driven and sampled with CLKB rising (¾ cycle timing). Buffer directional control for the memory bus is altered with CLKA rising.

INIT# (input, asserted low)

System components respond to INIT# by resetting to an initial state, then waiting for requests by external components.

The following arbitration/handshake signal lines allow an MCU to share access to the memory bus with other memory bus components:

RQ# (input, asserted low)

RQ# is asserted when there are one or more RQOUTs asserted.

CONT# (input, asserted low)

CONT# is asserted when there are two or more RQOUTs asserted. This indicates that there is contention for the bus.

The following memory bus signal lines allow an MCU to communicate with bus interface unit nodes on its attached memory bus. An MCU reads some initialization and configuration information on these lines at cold start time (INIT# assertion):

MACD [15:0] (bidirectional, tristate outputs)

See description above.

CTL [2:0] (bidirectional, tristate outputs)

See description above.

BUSSEL (Output)

This signal line allows an individual MCU chip to be enabled onto one of two buses. This may be used at initialization time to help configure the memory modules on the bus interface unit buses. The selection of one or the other buses is done by writing into the State Register in the MCU's local address space.

The following array interface signal lines provide the control of the array or memory module side of the MCU:

SLAD [19:0] (bidirectional, tristate outputs)

This is the main bus for transferring information to or from the array. During a memory access the SLAD bus is used for the following types of data transfers.

Memory Address

Read Data

Write Data (in the case of a write access or a correcting scrub)

RAS (Output)

Determines when an array access will start and when it will end. It also is the Row Address Strobe advanced so that the actual RAS# to the array can be clocked off of an external flip-flop to produce well controlled timing.

WE# (Output)

Write strobe used for write cycles and correcting scrub cycles.

DEIN (output)

External latch data enable (Master mode)

CASIN (input)

CAS strobe FRC input (checker mode)

BUS INTERFACE UNIT NODES

The primary function of the bus interface unit (100, 102, etc.) of FIG. 1 is to pass memory requests from a processor, (110 or 111) to an attached memory module (112) and to return to the processor any requested data.

Figure 2:
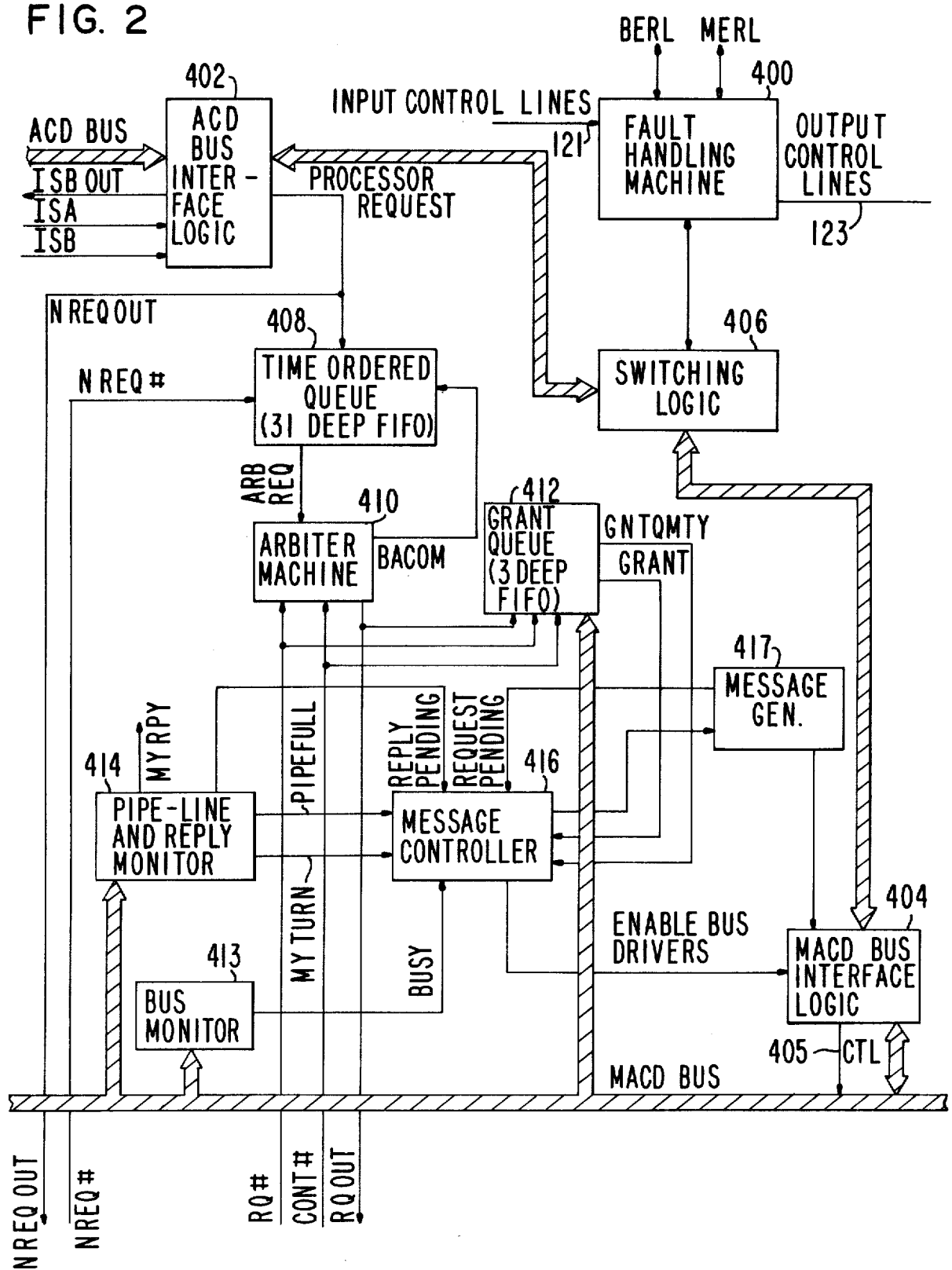
FIG. 2 is a more detailed block diagram of the bus interface unit (BIU) node shown in FIG. 1; and, FIG. 3 is a more detailed block diagram of the memory-control unit (MCU) shown in FIG. 1.

Referring now to FIG. 2, the bus interface unit component (100) is composed of a number of state machines, the functions of which will now be described briefly.

The ACD bus interface logic (402) receives and decodes requests from the processor. A transaction start is signaled by means of the ISA line from the processor as more fully described in the above-identified Jackson patent application.

The switching logic (406) includes means for buffering data transmitted between processor and memory. As data comes in for a write request, it is deposited here waiting for memory bus access and issue. As data comes in from a read acknowledgment, it is also deposited here, waiting for return to the processor.

The time-ordered queue (408) separates requests into time-order slots and assures that all requests in a particular time-order slot are serviced before any requests in the next time-order slot. The time-ordered queue also generates the internal line ARBREQ to the arbiter machine (410) to submit a received request to arbitration.

The arbiter machine (410) controls the energization of NRQOUT which causes other bus interface units to be informed of a new processor request on the NREQ# signal. Assertion of this signal causes all bus interface units to queue up a new time-ordering cycle. As requests are satisfied the bus interface units will dequeue cycles. The arbiter machine (410) in each bus interface unit performs this protocol, allowing each processor equal weight in obtaining memory. The bus access right is signaled by the grant line to the grant queue (412).

Controlled access to the MACD bus and the issuing of request and reply messages is performed by the pipe monitor (414), the message controller (416), and the MACD bus interface logic (404).

Recognizing requests, a bus interface unit will inform other bus interface units of a new processor request on the NREQ# signal line by asserting NREQOUT. Assertion of NREQ# causes all bus interface units to queue up a new time ordering cycle. Satisfying the requests of each time-ordering cycle, all bus interface units will dequeue cycles. Time-ordering circuitry in each bus interface unit performs this protocol, allowing each processor equal weight in obtaining memory.

Initialization and Configuration: At system reset time, the bus interface unit must be supplied with enough information to define its functionality in the system environment. During assertion of INIT# (cold reset time), initialization and configuration information is brought on chip.

The following processor specific information is provided with INIT#:

Assertion (cold reset) over the processor bus:

Processor bus number (module ID along processor axis): 6 bits

Processor type: 3 bits

To establish addressing coordinates for individual bus interface units in the bus interface unit interconnection scheme, each processor bus is assigned a unique number at initialization (INIT#) time. The number cannot be changed without INIT# assertion. This number, in the range 0-62, is one coordinate of the physical node address for the bus interface unit component. The other coordinate is the memory bus number, defined above. Processor-type interconnect components may inquire the type of processor attached to any bus interface unit by local accesses. As such, the processor type (identical to the GDP system architectural "processor class" referred to in the above-referenced Colley, et al application Ser. No. 971,661) is provided at INIT# time. This data is required and cannot be changed without INIT# assertion. This field allows system resource determination.

MEMORY CONTROL UNIT (MCU)

Figure 3:
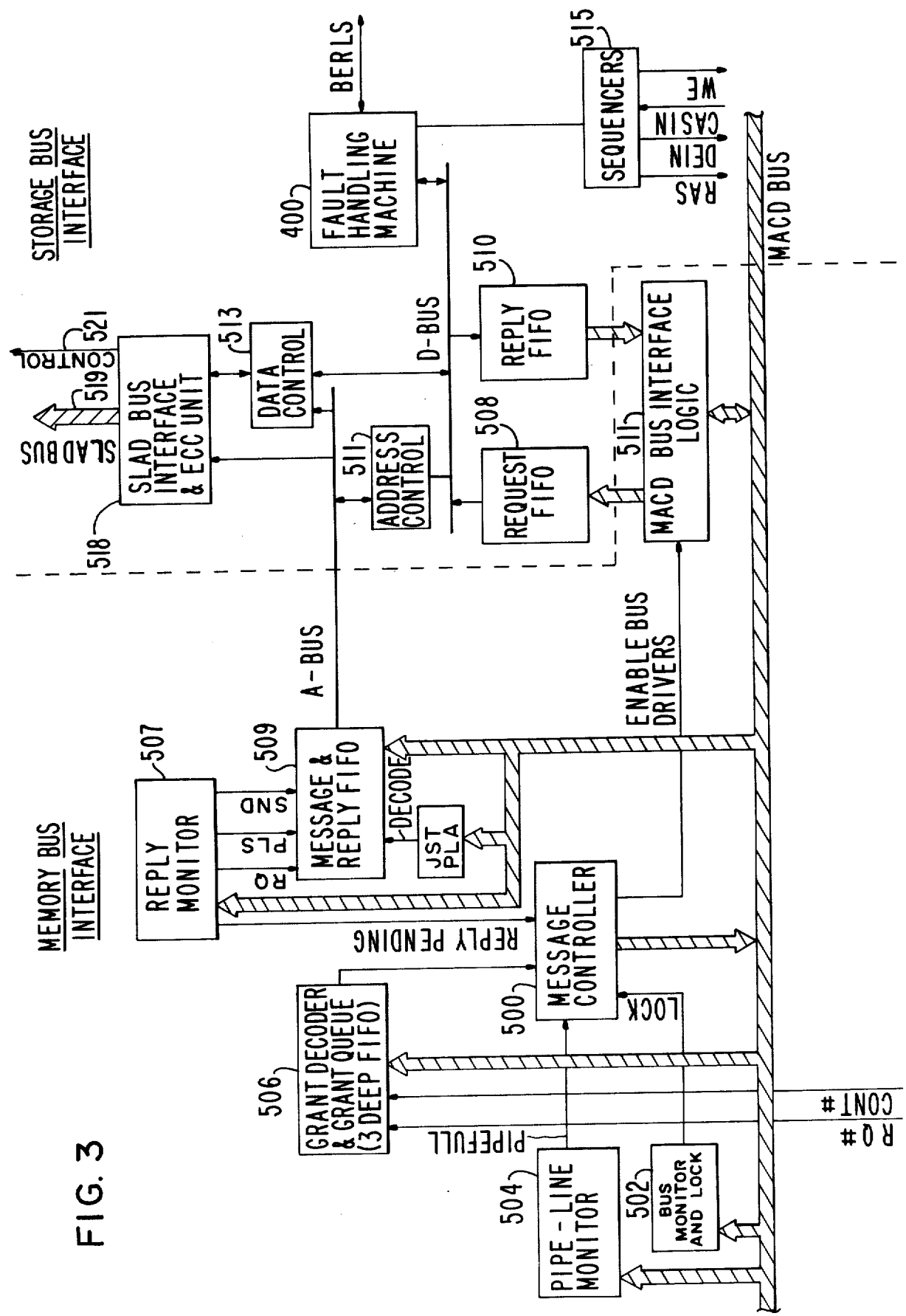

Referring to FIG. 3, the memory-control unit (102) shown in FIG. 1 will now be described. The memory control unit (MCU) is comprised of a memory bus interface portion and a storage bus interface portion, separated by the broken line in FIG. 3.

The memory bus interface includes a bus monitor (502), and a pipeline monitor (504), which drive a message controller (500). A grant decoder and grant queue (506) is connected to the message controller (500) to keep track of time slots that have been granted the bus interface units in the particular row of the switching matrix to which the MCU is connected. A reply monitor (507), connected to a message and reply FIFO (509), is provided to control the insertion of a reply message into an empty time slot.

The storage bus interface includes a request FIFO (508) and a reply FIFO (510) which are connected to the MACD bus interface logic (511) and to an internal bus, the D-bus. Attached to the D-bus is a fault-handling machine (400) which handles error conditions as is fully described in the above-referenced Budde, et al U.S. Pat. No. 4,438,494. Also attached to the D-bus is address control logic (511) and data control logic (513). The address logic (via the A-bus) and the data logic drive an SLAD bus interface (518) which connects to the memory module.

The MCU attaches to the memory bus (MACD), which provides the main communication path of the interconnect system. The MCU receives variable-length access requests at it memory bus interface from a bus interface unit on the MACD bus and makes the proper series of accesses to memory through its storage bus interface. After completion of the accesses to memory, the MCU returns the proper reply on the MACD bus.

The MACD bus is used for all communication between the MCU and other components. The access types that are supported are: read, write, read-modify-write (RMW)-read, RMW-write, register read, and register write, together with certain specific control messages called "blurbs" (e.g., IPCs—interprocessor communications of the type described in the above-referenced Jackson patent application). The accesses corresponding to these access types are handled on the memory bus with a series of messages transmitted under a specific control protocol. The following paragraphs briefly describe these messages and protocols.

There are three types of messages transmitted on the memory bus:

request (processor requests for all access types write accesses include the write data and increase bus pipe depth).

reply (any response to a request; replies decrease the bus pipe depth).

blurb (this includes IPCs, any general control message, and hooks for the future, and has no effect on bus pipe depth).

The memory bus runs in a three-level pipeline mode; that is, there may be three outstanding requests in the bus pipeline. Thereafter, any further request or blurb must wait for a reply message to free up a slot in the pipeline before proceeding. Therefore, it can be seen that all request messages increase the length of the pipeline, and all reply messages decrease the length of the pipeline. A blurb type does not affect the pipeline, and can be issued when the pipeline is not full. These different messages are differentiated by three control signals, CTL [2:0], that parallel the data portion of the bus. The message source (bus interface unit or MCU) drives the control lines to indicate the message type, the start and end of the message, and possible error conditions.

All users of the bus, bus interface units and MCUs, must arbitrate for the right to place a message on the bus. In the case of the MCU, this is a simple fixed priority arbitration, as compared with the arbitration mechanism for bus interface units, described more fully in the above-referenced copending application Ser. No. 342,837, of David Budde et al, which is more involved.

The MCU is connected to a single bank, 40-bit wide, ECC corrected dynamic RAM storage array with spare bit. The interface (518) between the MCU and the storage array is based on a 20-bit wide bidirectional bus, over which both data and addresses are multiplexed. This bus is called the Storage Local Address and Data bus (SLAD bus). The storage interface also includes several control lines involved with memory timing, and multiplexing control for the 20-bit SLAD bus. The array address is calculated in the MCU from the access address it receives on the MACD bus. The array address is from 16 bits (in the case of a 256-Kbyte array) to 20 bits (in the case of a 4-Mbyte array) in length, and the unused bits are set to zero. This array address is sent out on the SLAD bus in single clock cycle. Dynamic RAM address multiplexing is done externally to the MCU chip.

Memory read data is received by the MCU on the SLAD bus in two clock cycles, and follows the outgoing address by a specified number of clock cycles. The number of clocks to wait is specified at "INIT" time as the memory access time. In the first of the two cycles, the MCU receives the high order 20 data bits, and in the second cycle it receives the low order 12 data bits and the 7 ECC check bits, and the spare bit.

All memory write operations are carried out as read-modify-writes (RMW). The reason for this is to allow the ECC address check prior to doing the write so as to guarantee that a write will never occur at the wrong address. This "locks the memory up" on an address that can be verified through an ECC check. After the check demonstrates that no error has occured on the address lines, and the new storage word and check bits have been generated, the data is presented to the array through the SLAD bus in the same order that read data is received, and the write Enable line to the memory module is pulsed. The SLAD bus is also used at INIT time to enter into the MCU all memory bus independent initialization parameters. These are:

node address
memory board type or ID
MCU type or revision level
size of the attached memory array
refresh speed required
memory access time in clock cycles
connect to primary or backup bus. (Primary and backup bus operation is described in the above-referenced Budde et al application Ser. No. 296,025.) The MCU picks up the bus number from the specified memory bus during INIT time.

The MCU employs an error code in logic block (512) that detects all single- and double-bit errors and corrects all single-bit errors. The MCU computes check bits over the 32-bit data field, and also over the 20-bit address field. Thus, the check bits represent not only a unique data combination, but the unique data combination at a unique address. Therefore, when reading the array, the MCU can detect an address line failure because it will check ECC over the address that was sent to the array and the data that was received back. If the data came from the wrong location, the check bits will indicate an error in the failed address line. Therefore, reads are totally protected. Writes are also protected since they are always done as read-modify-writes to the memory array. This means that a fully protected read precedes every write. After the complete memory address is strobed into the RAMs, they become "locked" on that address. Then the read is checked. If the read was error free, the address is known to be good, and the write pulse is issued. If the read shows any error, the operation is aborted before the write pulse is issued.

The MCU operates as follows. Each request on the MACD bus will push the pipeline monitor (504) up one. When the pipeline monitor gets up to three deep or there are no more requests in the grant queue, the MCU knows that no bus interface unit can make a request, leaving the bus available for the MCU to make replies.

The request comes in and goes first to the justify PLA (JST PLA). The JST PLA asserts a decode signal to the message and reply FIFO (509) if the address falls within this module's address range, and then outputs a normalized upper address. The JST PLA subtracts the starting memory address from the requested address, normalizing it to zero, such that the memory-array address on the storage array will always start at zero. The rest of the address goes into the message FIFO (509).

From the message FIFO the request is passed via a request latch to a presequencer in the sequencer logic (515). The presequencer decodes the request and determines what kind of request it is and whether it's to be a register access, a diagnostic function, or memory access.

If it is a diagnostic function, control is passed to the LCOM command sequencer in the sequencer logic (515). If it is a memory access, control is passed to the array sequencer in the sequencer logic (515). If it is a diagnostic function that needs a memory access, the LCOM will then pass control to the array sequencer and the array sequencer will carry out the memory access. The array sequencer sequences the storage array controls and controls data flow in and out of the SLAD Bus Interface and ECC unit (518) to the storage array. A data sequencer in the sequencer logic (515) receives control from the array sequencer, and it controls data from the ECC unit back to the data reply FIFO (510).

For example, consider how this logic handles a read request. First, an address is placed on the SLAD bus and data is returned to the ECC unit. The array sequencer (515) controls ECC unit for error checking, while the data sequencer (515) is taking data back on the D-bus, and storing it in the reply data FIFO. The array sequencer then signals the memory bus interface and receives a signal back from the memory bus interface called REPLY READY.

Now the storage bus interface portion can start processing another request if one's been queued up while the memory bus interface starts processing a reply when it gets a grant.

For a write request, data gets stored in the request data FIFO (508), and the MACD bus is monitored by the bus monitor (502) and the pipeline monitor (504). The opcode and address are stored in the message FIFO (509). When the presequencer (515) decodes the write request, it will start the array sequencer. The array sequencer will first do a read, which obtains data from the memory array to check to see if the ECC indicates that this is the correct address. It then inserts the new data from the data request FIFO (508) wherever it's supposed to go in the array. Then data is written out on the SLAD bus to the array with the ECC generated.

MESSAGES

What follows is a description of the messages that can be sent over the memory bus between the bus interface unit and MCU. The messages are separated into message types: requests, replies, and bus blurbs.

Request Messages

Memory Read Request
  Encoding: 0000LLLL HADR, LADR
  Control Designation: 000,001

This request is issued by a bus interface unit (BIU) to an MCU in response to its attached processor's memory-read request. The receiving MCU satisfies the request by performing memory accesses and returning the following message:
  Read Reply
Memory RMW Read Request
  Encoding: 0001LLLL HADR, LADR
  Control Designation: 000, 001

This request is issued by a bus interface unit to an MCU in response to its attached processor's memory RMW read request or as a result of a previously-queued memory RMW-read request propagating to the top of the bus interface unit's RMW queue. The receiving MCU satisfies the request by performing memory accesses and returning one of the following messagess:
  Memory RMW Read Locked Reply
  Memory RMW Read Reply
Memory Write Request
  Encoding: 0010LLLL HADR, LADR, D0[, . . . , Dn]
  Control Designation: 001, [. . . , 001,] 000, 001

This request is issued by a bus interface unit to an MCU in response to its attached processor's memory-write request. The receiving MCU satisfies the request by performing memory accesses and returning the following message:
  write Acknowledge
Memory RMW Write Request
  Encoding: 0011LLLL HADR, LADR, D0[, . . . , Dn]
  Control Designation: 001, [. . . , 001,] 000, 001

This request is issued by a bus interface unit to an MCU in response to its attached processor's memory RMW-write request. The receiving MCU satisfies the request by performing memory accesses and returning the following message:
Memory RMW Write Acknowledge
Interconnect Register Read Request
  Encoding: 0100000L HADR, LADR
  Control Designation: 000, 001

This request is issued by a bus interface unit (whose bus number matches the specified bus number in the address to an MCU or a bus interface unit whose module number matches the specified module number) in response to its attached processor's interconnect register-read request. The receiving MCU/bus interface unit satisfies the request by performing the access and returning the following message:
Read Reply
Interconnect Register Write Request
  Encoding: 0110000L HADR, LADR, D0
  Control Designation: 001, 000, 001

This request is issued by a bus interface unit in response to its attached processor's interconnect register-write request (that is, the bus interface unit whose bus number matches the specified bus number in the address to an MCU or a bus interface unit whose module number matches the specified module number). The receiving MCU/bus interface unit satisfies the request by performing the access and returning the following message:
Write Acknowledge
Force Bad ECC (FBE) Request
  Encoding: 1010LLLL HADR, LADR
  Control Designation: 000, 001

This request is issued by a bus interface unit to an MCU in response to a permanent module error if the request was a multimodule write and the error-log module ID matches but the error-log bus ID does not match. (Error logs are described in the abovereferenced Budde, et al U.S. Pat. No. 4,438,494 ). The receiving MCU satisfies the request by inverting the ECC bits in any 32-bit word which contains one or more bytes of data indicated in the LLLL field of the request. It then returns the following message:
Write Acknowledge

Reply Messages

Read Reply
  Encoding: D0, Idle
  Control Designation: 010, 111
  or
  Encoding: D0, D1[, . . . , Dn]
  Control Designation: [011, . . . , 011,] 010, 011

This reply is the normal reply issued in response to one of the following requests:
  MCU to bus interface unit—Memory Read Request.
  MCU or bus interface unit to bus interface unit—Interconnect Register Read Request.
The response of the bus interface unit is to take in the data and return it to its attached processor.
Write Acknowledge
  Encoding: 11111111 11111111, Idle
  Control Designation: 110, 111

This reply is the normal reply issued in response to one of the following requests:
  MCU to bus interface unit—Memory Write Request.
  MCU or bus interface unit to bus interface unit—Interconnect Register Write Request.
  MCU to bus interface unit—Force Bad ECC Request.

The response of the bus interface unit is to allow the processor to continue.
Memory RMW Read Acknowledge
  Encoding: D0, Idle
  Control Designation: 010, 101
  or
  Encoding: D0, D1[, . . . , Dn]
  Control Designation: [011, . . . , 011,] 010, 101

This reply is the normal reply issued in response to the following request:
  MCU to bus interface unit—Memory RMW Read Request
The response of th bus interface unit is to allow the processor to continue.
Memory RMW Write Acknowledge
  Encoding: 11111111 11111110, Idle
  Control Designation: 110, 111

This reply is the normal reply issued by an MCU to a bus interface unit in response to a memory RMW-write request. The response of the bus interface unit is to allow the processor to continue. Other bus interface units pop their RMW queues since this indicates the normal completion of an RMW access.
Memory RMW Read Locked Reply
  Encoding: 11111111 11111100, Idle
  Control Designation: 110, 111

This reply is issued by an MCU to a bus interface unit in response to a memory RMW-read request if the MCU is already locked by another processor's RMW request. The bus interface unit queues the request on its RMW queue and issues an RMW enqueue message so that other bus interface units will queue this request on their RMW queues.

Bus Blurbs

IPC
  Encoding: 00000000 PPPPPPPP, Idle
  Control Designation: 100, 111
RMW Enqueue
  Encoding: 11111111 11111111, Idle
  Control Designation: 100, 111

MACD BUS ARBITRATION MECHANISMS

A large number of processors may be attached to a single MACD bus by means of bus interface units. Arbitration must be provided between contending requests for access to the bus. The arbitration mechanism is more fully described in the above-referenced copending application Ser. No. 342,837 of David Budde et al. This arbitration mechanism is briefly described below.

The arbitration logic of FIG. 2, that coordinates the traffic of requests from these processors and the return replies meets the following critera:
  No processor request can be "starved" (i.e., never serviced).
  A minimum number of input/output pins is required.
  Bus pipeline and request-reply pairing is used to advantage.
  The number of "dead cycles" on the MACD bus caused by waiting for arbitration is minimized.
  The arbitration mechanism is fault tolerant.

Referring to FIG. 2, requests received from processors go through two levels of arbitration before going onto the MACD bus. The first ordering of requests is done via a first-come, first-served algorithm within the time-ordered queue (408). The time-ordered queue keeps requests separated into time-order slots and assures that all requests in a particular time-order slot are serviced before any requests in the next time-order slot. This guarantees that starvation will never occur.

It is possible, however, that several processor requests may be made at the exact same time and be assigned to the same time-order slot in the time-ordered queue. For this reason a second level of arbitration orders multiple requests within a single time-order slot. The algorithm used is found within the arbiter machine (410) and is called binary arbitration. Based on the logical module numbers of the bus interface units making the requests, the arbiter machine (410) separates and orders requests from the time-ordered queue and places them in a three-deep grant queue (412). At this point requests are fully ordered and only one request is at the head of the grant queue at any one time.

Since requests and replies always come in pairs, the ordering of replies is avoided by stipulating that replies must return in the same order as their corresponding requests were made. A request FIFO (508) in the MCU stores requests in the order that they are made. In the bus interface unit, a pipeline-monitor machine (414) makes sure that replies from the MCU are returned to the processor in the correct order.

Both requests and replies are fully ordered, such that at any one time there is only one request and one reply that can go onto the MACD bus. The MACD bus protocol is designed to work in conjunction with the arbitration mechanism so that there is never contention between the request at the top of the grant queue (412) and the reply at the top of the pipeline (414). This protocol only allows requests at certain times and replies at other times. At no time does the protocol allow both a request and reply onto the bus at the same time.

Time ordering is the first stage of arbitration for requests coming from processors. Assuming that there are 31 processors that can make requests, each bus interface unit requires two pins and a 1-bit by 31-deep time-ordering queue (408) to implement time ordering. MCUs do not have time ordering since they never make requests, they only make replies.

When a bus interface unit receives a request from its processor, the bus interface unit asserts the pin NREQOUT (New Request Out). External to the bus interface unit, NREQOUT drives the input of an open collector inverter (411) whose output is or-tied to the NREQ# line.

NREQ# goes low (becomes asserted) any time a new request is received by any bus interface unit along the MACD bus. With respect to the time-ordered queue (408), every cycle that NREQ# is low defines a new time-order slot. When a bus interface unit sees that NREQ# is asserted, it pushes a one onto the time-ordered queue if it just asserted NREQOUT; otherwise, it pushes a zero onto the time-ordered queue. All bus interface units in a row on the MACD bus push their respective time-ordered queue at the same time, pushing a one if they have a request in that particular time-order slot, and a zero if they do not. The queues thusly operate in parallel.

The bit at the head of each of the time-ordered queues is called ARBREQ (Binary Arbitration Request) and it indicates to the binary arbiter (410) that the bus interface unit wants to participate in binary arbitration. The majority of the time there will only be a single request per time-order slot and in those noncontended cases, binary arbitration is extremely simple, a grant is issued to that request immediately. There is absolutely no additional time penalty paid in those cases for doing binary arbitration.

When contention between several requests does arise, binary arbitration starts narrowing down contenders until a winner is found. To accomplish this, each bus interface unit utilizes its unique 6-bit logical module number. The binary arbitration state machine (410) asserts RQOUT when it reaches ARBREQ from the time-order queue (408) and examines RQ# (Request), an input coming from an external or-tied line driven by the RQOUTs along the bus, (exactly like NREQ# and NREQOUT). RQOUT (request out), is an output asserted by the bus interface unit binary arbitration machine (410) to indicate to other bus interface units that it is contending for access to the bus. The binary arbitration state machine (410) examines CONT# (contention, an input which is pulled down upon the condition that two or more RQOUT lines are asserted, signifying that two or more bus interface units are contending for access to the bus. Together RQ# and CONT# having the following meaning:

| RQ# | CONT# | MEANING |
|---|---|---|
| 1 | 1 | No one is making a request |
| 0 | 1 | One bus interface unit is making a request and it gets a GRANT |
| 0 | 0 | Two or more bus interface units are contending. |

The fourth combination can never validly occur. When two or more bus interface units contend, binary arbitration may take a number of cycles to determine which bus interface unit will be granted access to the bus. At each successive cycle, each bus interface unit's binary arbiter machine scans the next bit in its respective logical module number to make a decision as to whether it should continue to arbitrate or concede to another bus interface unit with a higher priority logical module number. Logical module numbers are scanned from most significant bit (MSB) to least significant bit (LSB) and at each bit position, bus interface units with zeros in their numbers win out over those with ones.

All modules (both bus interface units and MCUs) maintain the grant queue in order to facilitate MACD bus protocol which will be described subsequently. When all of the requests at the top of the respective time-ordered queues in the bus interface units have been given grants by the arbiter, each bus interface unit's arbiter generates an internal signal called BACOM (Binary Arbitration COMplete). BACOM causes the time-ordered queue to pop and introduces the next time-order slot to begin binary arbitration.

The grant queue (412) is a three-deep FIFO which is used to buffer granted requests waiting for bus time. Unlike the time-ordered queue, the grant queue has only one request at the head of the queue in one of the bus interface units at any one time. The request at the head of the grant queue is guaranteed to be the next request to go out onto the MACD bus. After the request has been made, then it is popped off of the queue. The purpose of the grant queue is to allow the arbiter to proceed independently of and in parallel with the bus protocol and to get as much as three grants ahead of the bus. As long as the arbiter can generate grants as fast or faster than the bus can use them, all of the internal delays due to both time ordering and binary arbitration will not introduce delays or dead cycles onto the MACD bus. While the bus is busy with a particular request, the arbiter is able to work in parallel on generating a grant for a request to be put on the bus at a future time. The bus rarely needs to wait for a grant.

MACD Bus Protocol

The MACD bus is used for both request and reply messages. While an MCU does not send request messages, it must contend for MACD bus access along with the bus interface units in order to place a reply message on the bus. Therefore an arbitration mechanism without a time-ordered queue is implemented in the MCU. The grant decoder and grant queue (506) guarantees that there will only be one bus access request with a grant at the top of the grant queue at any one time. Likewise, the pipeline monitor guarantees that there is only one reply that can be the next reply on the bus. In order to provide that the request at the top of the grant queue and the reply at the top of the pipeline do not have to arbitrate with each other for use of the MACD bus (wasting precious bus cycles) the following protocol causes the bus to be shared between requests and replies and maximizes the bandwidth of the bus. This protocol is implemented in every bus interface unit in the messaae controller machine (416) and every MCU in the message controller machine (500). The protocol guarantees that any time at most one bus interface unit/MCU will drive the bus:

deep grant queue has been met. The MACD bus monitor signals the message controller via the BUSY line if the MACD bus is presently occupied with a request or reply message. Even though the MCU does not send request messages, it maintains a grant queue in order to implement the above-described protocol.

MEMORY ACCESS PROCEDURE

Memory accesses are received from a processor by all bus interface unit's in a column over the ACD bus, strobed by ISA, in accordance with the ACD bus protocol described in the above-referenced Jackson application. When an access is detected, a bus interface unit will perform the following operations:

1. Access Recognition: determine participation, referring to memory starting and ending addresses and to the interleave type and value;
2. Arbitration: arbitrate for access to the memory bus;
3. Grant: issue a memory bus access, with appropriate address and length, as required to perform its part of the processor bus request;
4. Release: release memory bus to further requesters;
5. Wait for response;
6. Accept reply, as required.

Participation in an access is recognized in the bus interface logic (402) by checking portions of the received ACD address against the following information:

| Conditions | | | | | |
|---|---|---|---|---|---|
| BUSGNT | MYTURN | GNTQMT | PIPEFUL | BUSY | Action |
| — | 1 | 1 | — | 0 | Put reply on the bus. |
| — | 1 | 0 | 1 | 0 | Put reply on the bus. |
| 1 | — | — | 0 | 0 | Put request or blurb on the bus. |

BUSGNT: 1 Asserted by grant queue (412) if this bus interface unit has a request at the top of the grant queue.
MYTURN: 1 Asserted by the pipeline monitor if this bus interface unit or this MCU is the next in turn, as indicated by the pipeline, to make a reply.
GNTQMT: 1 Asserted by the grant queue if any requests have received grants and are waiting for the bus.
PIPEFUL: 1 Asserted by pipeline monitor if there are three requests which have been made that are waiting for replies.
BUSY: 1 Asserted by MACD bus if the MACD bus is presently occupied with a request or reply message.

The latency between a request and its reply during heavy bus usage is the length of approximately four messages. This time can be used by the MCU to access the memory storage array and prepare a reply.

Request FIFO, Pipe Monitor, and Reply Monitor

The request FIFO (508) in the MCU, and a request FIFO within the message controller (416) in the bus interface unit, is where request messages are queued by the replier (the MCU or another bus interface unit, for those cases where the request is directed to a bus interface unit) while a reply message is being prepared. The message-controller machine in the MCU or bus interface unit uses the request message in formulating the reply. A request message is popped off the request FIFO when the matching reply has been put out onto the bus. The reply monitors keep track of the depth of the pipe as well as the ordering of replies. The reply monitor signals via the MYTURN line when it is the replying bus interface unit/MCUs turn to use the bus for the purpose of making a reply. The reply monitor of the original requester signals via the MYRPY line when the next reply on the bus is the one in response to the request of that original requester. The pipeline monitors signal the message controllers via the PIPEFUL line if there are three requests which have been made that are waiting for replies, thus signifying that the limit of the 3 memory cluster start, memory cluster end, interleave type and value. Computations using starting and ending cluster values allow a bus interface unit to find if a request should be passed to the memory bus. Determining participation causes indication of a new time-ordering cycle to other bus interface unit components on the memory bus, using NREQOUT.

Sharing of the memory bus among the bus interface units attached to that memory bus is determined by a two-stage arbitration scheme which guarantees cyclical sharing of the bus with no possibility for lockout of a requester. The first stage is time-ordered—first come, first served—and is implemented as a FIFO queue (408). Since any number of the processors on a memory bus may request access during any one time-ordering cycle, a second level of arbitration is provided. This arbitration (410) is a serial priority scheme. From a global standpoint, the accesses are time ordered. Priority under the time-ordered arbitration is determined by a binary sort in the 6-bit node address of the bus user. The sort is accomplished by all requesters pulling the bus request line (RQOUT). It it is determined that there is no conflict (only one requester) then bus access is granted. If there is a request conflict (multiple requesters) the sort begins. This is a sequential process taking up to six cycles. In the first cycle, all requesters whose high order node address bit is zero, remove their request from the bus request line. If the conflict is then resolved, the arbitration is complete; if not the arbitration proceeds to the next bit in the node address, and so on until there is no conflict. The winner of the arbitration then proceeds, and the other requesters compete for bus access in the next arbitration cycle.

Contention is determined by an or-tied (CONT#) line which is pulled high by a constant current source. When a bus user pulls the bus request line (RQOUT), it also pulls this contention line through its own constant current source. The current sources are adjusted so that two or more will deplete the current source pulling the CONT# line high, thus the voltage level will fall.

When a bus interface unit completes recognition of an access, a new time ordering cycle is signaled to other bus interface units attached to the same memory bus by asserting NREQOUT. (Other bus interface units on that memory bus may randomly recognize accesses from their own attached processor at the same time. These requests all belong to the same time ordering-cycle, signaled simultaneously on NREQ# by all requesting bus interface units using NREQOUT.)

Indivisible read-then-write access pairs to a data item are supported by the time-ordered arbitration mechanism. A bus interface unit accommodates this access by participating in a read-modify-write (RMW) locking protocol with other bus interface units and the memory unit on the memory bus.

There are two phases of RMW activity. When a processor makes an RMW request, it first traverses the normal time-ordering queue as described above. When the time cycle arrives for service of the request, there are two possibilities: (1) the memory bus is locked to RMWs, and (2) it is OK to attempt an RMW-read request.

If the memory bus is not locked, a bus interface unit with an RMW-read will simply go ahead with its request. If an RMW operation is underway, from another bus interface units RMW-read, and there has already been an intervening attempt to do another RMW read, which failed, the RMW which is locked out is queued in a secondary time-ordering queue. Time-ordered service of the RMWs is accomplished by enqueuing the locked RMWs in the order they reach the top of the normal time-ordering FIFO. When an RMW-write completes the pending RMW, those bus interface units with enqueued RMW reads will take their turn requesting RMW-reads. After an RMW read is successfully serviced for a bus interface unit, it may then continue accepting normal reads and writes from its attached processor.

The protocol outlined above assures:
RMW service in time order with other RMWs,
RMW service as soon as possible,
Continuation of normal requests' throughput.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. For use with a memory bus including a data portion, said bus providing the means of communication between a memory control unit connectable to a memory module capable of being accessed by said memory control unit, and at least one bus interface unit connectable to a data processor, said data processor being capable of issuing memory requests including address information for a data transfer operation requested of said memory and capable of receiving memory replies including data requested from said memory, each of said memory replies being responsive to a particular memory request, wherein accesses to said memory are handled by means of a series of messages transmitted to said memory control unit in accordance with a specific control protocol, said data processor being further capable of issuing control information for bus transactions, the combination comprising:

message generator means for generating messages in the form of packets of information for transmission on said memory bus, said messages being divided into message types including control message types of packets, request message types of packets corresponding to said memory requests, and reply message types of packets corresponding to said memory replies, each packet comprising one or more bus transmission slots issued by said message generator means sequentially and contiguously, each bus transmission slot in a packet being capable of including an opcode, address, data, control, and parity-check bits;

a pipeline queue;

message controller means connected to said message generator means and to said pipeline queue for controlling said request message packets and said reply message packets such that a predetermined number of said request message packets may be entered into said pipeline queue at any one time;

monitor means connected to said message controller means and to said memory bus for monitoring said request message packets and said reply message packets generated on said bus by said message generator, such that request message packets in excess of said predetermined number are prevented from being generated until a reply message packet is received to thereby free-up a slot in the pipeline;

control signal lines operative in parallel with the data portion of said bus for providing a coded signal representing a particular message type generated on said bus by said message generator; and, interface logic means connected to said message generator means and to said control signal lines, responsive to said message generator, for driving said control lines to indicate the message type;

said message generator means including means for inserting a particular reply message packet corresponding to a particular request message packet in said pipeline queue at a position in said pipeline queue corresponding to the request message packet that is associated with said particular reply message packet.

2. In a data processing system in which a switching matrix provides electrical interconnections between horizontal MACD buses and vertical ACD buses connected in said matrix by means of nodes including bus interface unit nodes and memory-control unit (MCU) nodes, communication means in one of said nodes comprising:

recognizing means connected to said ACD bus for recognizing signals on said ACD bus representative of a request to said one node;

means connected to said MACD bus, responsive to said recognizing means, for generating on said MACD bus, signals on said MACD bus representative of a write-request packet or a read-request packet, said packets comprising a number of bus transmission slots, issued sequentially and contiguously, each slot in a packet including opcode/address/data bits and control bits, said write-request packet comprising an opcode specifying a function desired, an address specifying a physical memory location, and write data, said read-request packet including an opcode specifying a function desired, and an address specifying a physical memory location;

receiving means connected to said MACD bus for receiving a reply message packet on said MACD bus, said reply message packet comprising a number of bus transmission slots, received sequentially and contiguously, each slot in said reply packet including opcode/data bits and control bits, said reply message packet containing a header opcode and/or data;

message control means connected to said generating means and said receiving means, said message control means including:

means for queuing data in said write request packet, means responsive to said control bits in said read and write packets for detecting the start and end of a packet, means for decoding said opcode to perform a function desired, means for establishing a pipeline for said request message packets and said reply message packets generated on said bus by said message generator, and, monitor means connected to said message control means and to said MACD bus, for monitoring signals on said MACD bus representative of said request and reply packets on said bus, such that a request packet is prevented from entering said pipeline until a reply packet is received to free-up a slot in said pipeline, whereby request packets increase the length of said pipeline up to a predetermined number of request packets in said pipeline, and reply packets decrease the length of said pipeline; and, means connected to said recognizing means, said generating means, said message control means, and said receiving means, for arbitrating said signals on said ACD bus representative of requests from said ACD bus going onto said MACD bus and said signals on said MACD bus representative of replies received from said MACD bus, to thereby enable said message control means to insert a reply packet associated with a particular request packet in the pipeline position of said recognized request packet.

3. The combination in accordance witn claims 1 or 2, wherein said monitor means includes:

reply monitor means including means for maintaining a queue of reply packets in the same order as the order of associated request packets, means for informing a replying node when it is time to reply and means for informing a requesting node when an associated reply packet is to arrive.

4. The combination in accordance with claim 1 further comprising:

means connected to said monitor means and said message controller means, for arbitrating said signals on said ACD bus representative of requests from said ACD bus and said signals on said MACD bus representative of replies received from said MACD bus, to thereby enable said message controller means to insert a reply packet associated with a particular request packet in the pipeline position of said request packet.

5. The combination in accordance with claim 1 wherein said means for generating packets includes:

means for generating on said bus a write-request packet and a read-request packet, said write-request packet comprising an opcode specifying a function desired, an address specifying a physical memory location, and write data, said read-request packet including an opcode specifying a function desired, and an address specifying a physical memory location; and, wherein said message controller means further comprises:

means for queuing data in said write request packet;

means responsive to said control bits in said read and write packets for detecting the start and end of a packet; and, means for decoding said opcode to provide an indication of a function.

6. The combination in accordance with claim 3 further comprising:

means connected to said monitor means and said message controller means, for arbitrating said requests onto said bus and said replies received from said bus, to thereby enable said message controller means to insert a reply to a particular request in the pipeline queue at a position in said pipeline queue corresponding to the request message packet that is associated with said particular reply message packet.

7. The combination in accordance with claim 3 wherein said means for generating packets includes:

means for generating on said bus a write-request packet and a read-request packet, said write-request packet comprising an opcode specifying a function desired, an address specifying a physical memory location, and write data, said read-request packet including an opcode specifying a function desired, and an address specifying a physical memory location; and, wherein said message controller means further comprises:

means for queuing data in said write request packet;

means responsive to said control bits in said read and write packets for detecting the start and end of a packet; and, means for decoding said opcode to provide an indication of a function.

8. The combination in accordance with claim 4 wherein said means for generating packets includes:

means for generating on said bus a write-request packet and a read-request packet, said write-request packet comprising an opcode specifying a function desired, an address specifying a physical memory location, and write data, said read-request packet including an opcode specifying a function desired, and an address specifying a physical memory location; and, wherein said message controller means further comprises:

means for queuing data in said write request packet;

means responsive to said control bits in said read and write packets for detecting the start and end of a packet; and, means for decoding said opcode to provide an indication of a function.

* * * * *